United States Patent [19]

Sherman

[11] 4,287,468

[45] Sep. 1, 1981

[54] DIMMER CONTROL SYSTEM

[76] Inventor: Robert Sherman, 1555 Rising Glen Rd., Los Angeles, Calif. 90069

[21] Appl. No.: 937,258

[22] Filed: Aug. 28, 1978

[51] Int. Cl.$^3$ ............................................. H05B 37/02
[52] U.S. Cl. ................................... 323/322; 323/319; 315/293; 315/DIG. 4
[58] Field of Search ............... 323/19, 24, 225 C, 319, 323/322, 324; 307/252 T, 252 UA; 315/292–293, 295, 194, 314–316, DIG. 4

[56] References Cited

U.S. PATENT DOCUMENTS

| 3,684,919 | 8/1972 | Cramer ...................... 315/DIG. 4 X |
| 3,706,914 | 12/1972 | Van Buren ...................... 315/292 X |
| 3,766,431 | 10/1973 | Isaacs ................................... 315/292 |
| 3,878,358 | 4/1975 | Barton et al. ...................... 323/24 X |
| 4,039,897 | 8/1977 | Dragoset ........................... 323/24 X |
| 4,095,139 | 6/1978 | Symonds et al. ................ 315/293 X |

OTHER PUBLICATIONS

Burt Harris, "Zero Voltage Switching Power Control Circuit", Electronic Engineering Times, Dec. 12, 1977, p. 44.
W. Check et al., "Microcontroller Includes A-D Converter for Lowest-Cost Analog Interfacing", Electronics/May 25, 1978, pp. 122–127.
W. F. Ittner et al., "Microcomputer's On-Chip Functions Ease Users' Programming Chores", Electronics/Jul. 20, 1978, pp. 129–133.
John L. Hilburn et al., "Microcomputers/Microprocessors: Hardware, Software, and Applications", Prentice-Hall, Inc., 1976, pp. 105–108.

Primary Examiner—William M. Shoop
Assistant Examiner—Peter S. Wong
Attorney, Agent, or Firm—Lyon & Lyon

[57] ABSTRACT

There is disclosed herein a method and apparatus for controlling the power dissipation in a load particularly suitable for use as a dimmer control for lighting circuits. Selected half cycles are applied to a load, such as an incandescent lamp. The number and sequence of the half cycles applied to the load are selected by logic circuitry which, according to the setting of a dimmer control, determines how many complete half cycles out of the total available to apply to the load. Zero crossing switching is used.

20 Claims, 5 Drawing Figures

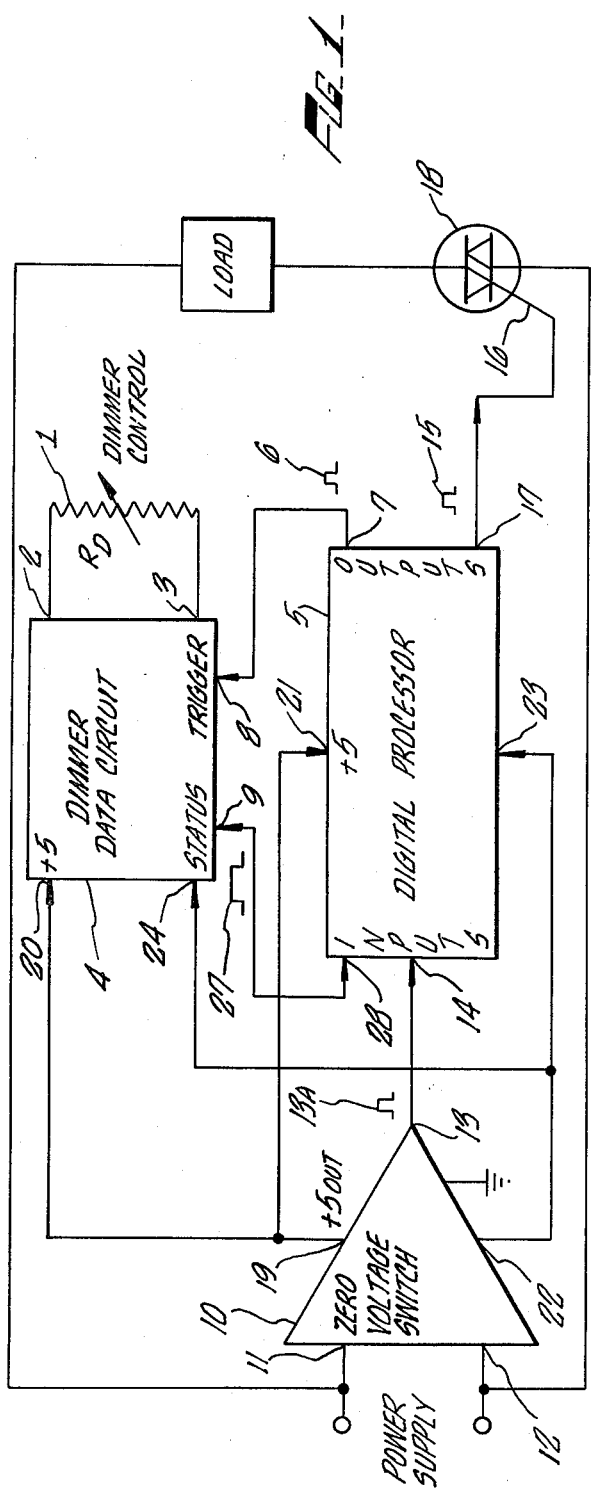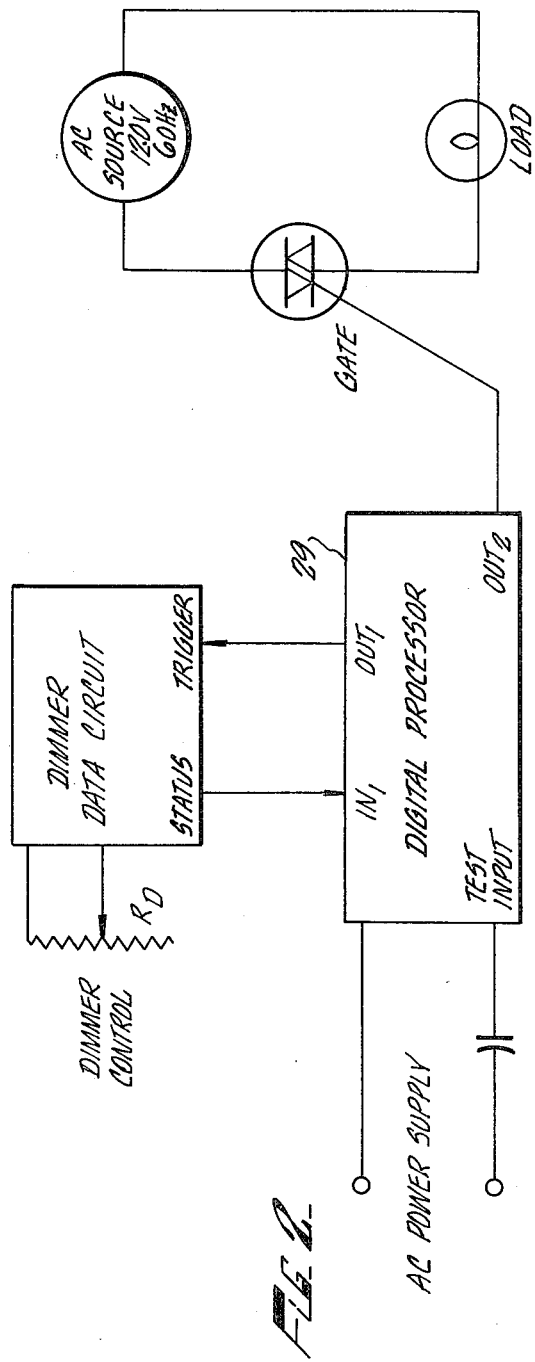

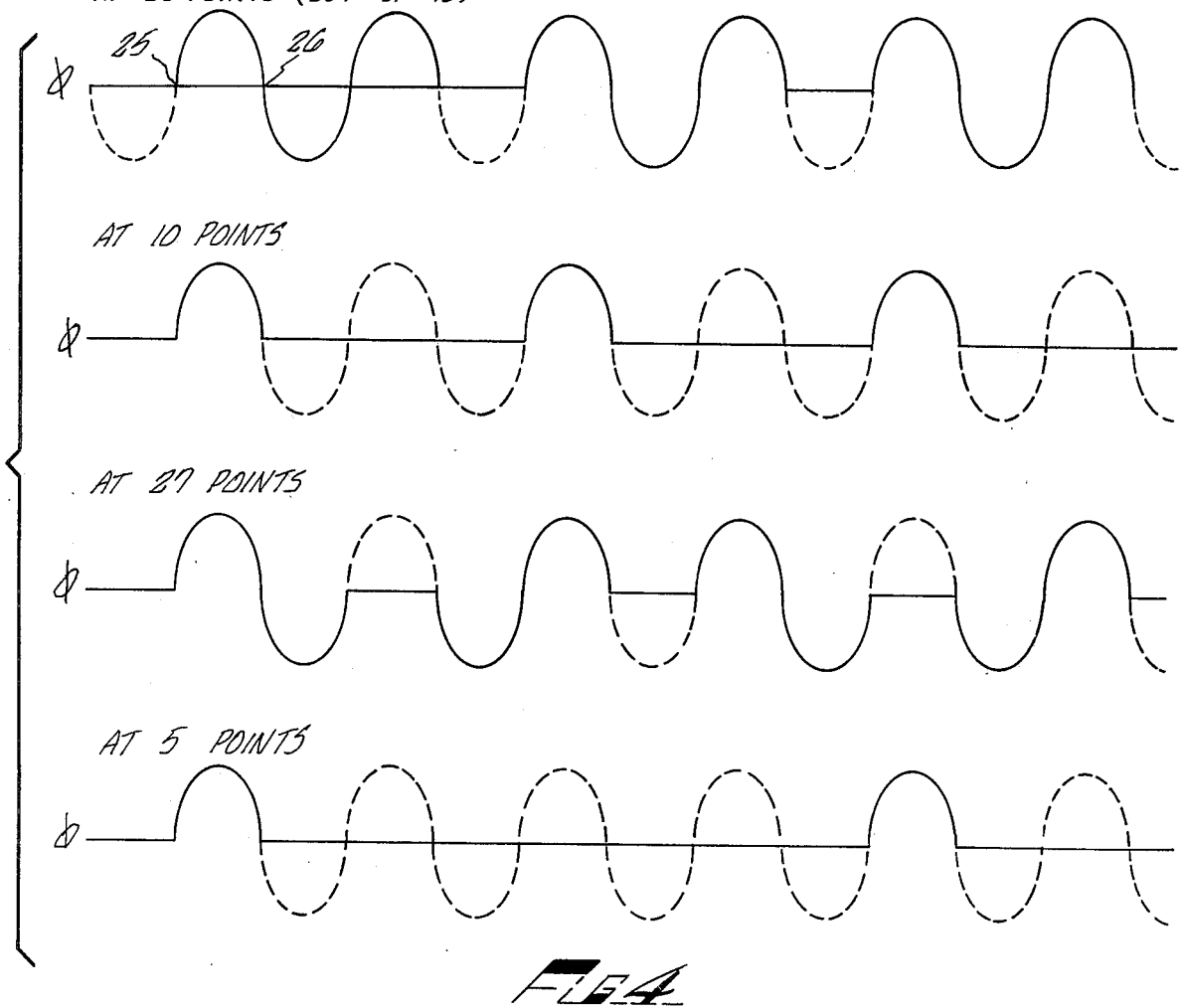

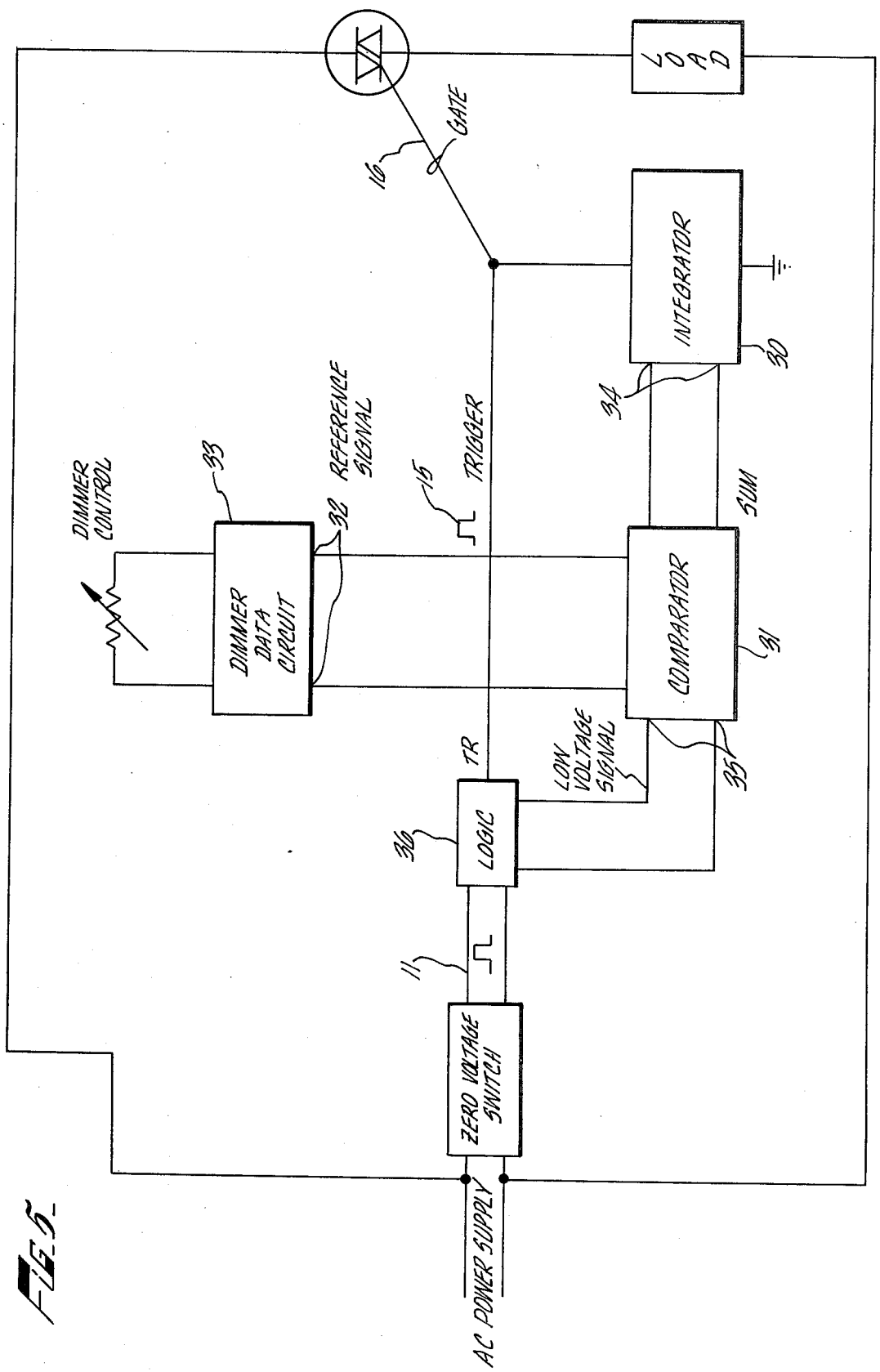

DIMMER CONTROL SYSTEM

BACKGROUND OF THE INVENTION

The present invention relates to the field of dimmer control systems for home and industrial lighting systems.

Various dimmer systems have been disclosed in the prior art for controlling power dissipation in a load. The simplest dimmer systems involve connection of a variable resistance in series or parallel with the load. These systems waste energy in $I^2R$ heat losses in the variable resistance.

With the advent of solid state switching devices such as Triacs, other kinds of dimmer control systems have been devised. The most common of these systems involves switching of the Triac to the conductive state at some point on the waveform such that only a fraction of the complete waveform reaches the load. Power dissipation in the load in such systems depends upon how large a "piece" of the waveform is allowed to reach the load.

These prior art dimmer control systems suffer from several disadvantages. Principal among these disadvantages is radio frequency interference and audio noise. This noise is caused by transient phenomena generated when the power source is connected to the load at some point in the voltage waveform other than the zero crossing. These transients manifesting themselves as electrical noise represent wasted electrical energy.

Nonlinearity has also been a problem in these prior art systems in that many dimmer control systems will not begin to light the lamp until a point near the mid range of the dimmer control is reached.

Further, lamp life is shortened when surge currents caused by connection of the filaments to power sources near peaks in the voltage waveforms occurs. These same surge currents can overload current limiters in power supply circuits.

Accordingly, the present invention is directed to a dimmer control method and apparatus which effectively produces low noise, linear dimming control without transient surge currents. Radio frequency interference, audio noise, and transient surge currents are substantially eliminated by zero voltage switching. Linearity is improved because pre-programmed sequences of half-cycles are applied for any given setting of the dimmer control.

The dimmer control method and apparatus of the present invention is useful in home, theatrical, restaurant and many other commercial applications.

The present method and apparatus involves using a digital processor to sample the desired power dissipation setting of a dimmer control and then looking up a pre-programmed sequence of 0's and 1's for that setting in the processor's read only memory (ROM). Each setting of the dimmer control is converted by a dimmer data circuit to a pulse whose width reflects the setting of the dimmer control. The maximum setting of the dimmer control will be reflected in a pulse from the dimmer data circuit of a certain maximum width. Lesser settings result in lesser pulse widths. The digital processor periodically checks the setting of the dimmer control by sending a trigger pulse to the dimmer data circuit. This circuit then responds by sending a pulse of a width representative of the desired power dissipation setting back to the digital processor.

When this pulse from the dimmer data circuit arrives, the digital processor examines it to determine if the setting of the dimmer control has changed. This can be accomplished by counting the number of cycles of the digital processor's internal clock which occur while the dimmer data pulse is "high".

There is stored in a read only memory in the digital processor a separate bit sequence of 0's and 1's in the form of several multi-bit words for each of forty different power level settings of the dimmer control. If there are forty discrete levels, the sequences need be only forty bits long. For a given setting of the dimmer control, the digital processor cycles through each bit of each word in the bit sequence of 0's and 1's corresponding to that desired power level. The digital processor examines one bit of the sequence per each half cycle of the power supply waveform. If the digital processor finds a zero, it will not send a complete half cycle through the load. If it finds a one, then it will.

The inventor has recognized that the noise, surge current and nonlinearity problems of the prior art systems could be solved by using zero voltage switching and pre-programmed sequences of zeroes and ones in combination in a dimmer system. Intensity of the lamps can be controlled at low levels by merely adding more 1's to the sequence.

A zero voltage switch which is either a separate component or incorporated into the digital processor, sends a signal to the digital processor every time the power supply voltage waveform crosses zero. This signal tells the processor several things: first, how often to check the next location in the pre-programmed sequences; second, when to send an output trigger pulse to the Triac connected so as to connect the load with its power supply when the output trigger pulse is received. The Triac turns itself off at the next 0 crossing.

The advantages and features of the present invention will become more apparent from the following description of embodiments thereof, taken in conjunction with the accompanying drawings, in which FIG. 1 is a block diagram of the preferred embodiment.

FIG. 2 is a block diagram of another embodiment.

FIG. 3 is a drawing of some of the preprogrammed sequences of 0's and 1's where the numbers at the left equal the "point value"—i.e., the desired power dissipation setting assigned to that particular sequence with forty "points" being a sequence of all ones representing full power where all half cycles available are applied to the load.

FIG. 4 represents typical waveform patterns that would be applied to the load at dimmer control settings of 30, 10, 27 and 5 points, respectively out of the 40 possible points.

FIG. 5 is a block diagram of a possible analog embodiment.

Turning now to FIG. 1, dimmer control 1, which is a variable resistance, is connected to input terminals 2 and 3 of dimmer data circuit 4. Dimmer data circuit 4 can be an Intel 555 Integrated Circuit Timer. Dimmer data circuit 4 senses the variable resistance of dimmer control 1 across input terminals 2 and 3 and generates a dimmer data signal in the form of a pulse at status terminal 9 whose pulse width is indicative of the setting of dimmer control 1. This dimmer data signal appears at status terminal 9 only when trigger pulse 6 from output terminal 7 of digital processor 5 arrives at trigger input 8 of said dimmer data circuit. Dimmer data circuit 4 can also be an analog to digital converter connected to an analog control device or an "encoded switch" which is a variable setting control device which converts its setting by self-contained circuitry to an analog or digital output signal.

Digital processor 5, which can be on Intel 8021 single chip 8 bit microprocessor, checks the status of the dimmer control 1 every half cycle. Zero voltage switch 10, which can be an RCA CA 3059, is connected across the power supply at terminals 11 and 12. Zero voltage switch 10 senses the zero crossings of the power supply's voltage waveform. Zero voltage switch 10 then generates a zero crossing plate 13A at each power supply voltage zero crossing. This pulse leaves zero voltage switch 10 at terminal 13 and arrives at digital processor 5 at terminal 14. Referring to FIG. 4, power supply zero crossings are exemplified at 25 and 26. This zero crossing pulse 13A pulse serves several purposes; first, it tells digital processor 5 how often to check the status of dimmer control 1; second, it tells digital processor 5 how often to perform its logic operation of calculating whether to send another half cycle to the load.

Zero voltage switch 10 also serves the purpose of supplying digital processor 5 and dimmer data circuit 4 with the positive five volt D.C. power supply necessary for their operation. This positive five volts is available at terminal 19 of zero voltage switch 10 and is connected to terminals 20 and 21 of the dimmer data circuit 4 and digital processor 5 respectively. Return current leaves digital processor 5 at terminal 23 and dimmer data circuit 4 at 24 and enters zero voltage switch 10 at terminal 22.

Digital processor 5 is a typical microprocessor. It contains a data memory for storing data that is not constantly changing. Such a data memory means could be a random access memory or a read only memory. Bits in the form of logic 0's and 1's usually symbolized by the presence or absence of a certain voltage level or state of energization, are stored in this data memory. Generally data is stored in the form of multi-bit words each bit being a logic 0 or 1. Typically one address in the data memory will contain a single 8 bit word. When this address is read, this 8 bit word will be transferred to an 8 bit storage register elsewhere in the processor over a "bus."

The storage register is usually a shift register in series machines having a single output line but can be a series of flip flops connected to 8 output lines in paralleled machines. Usually several of these storage registers are connected to an arithmetic unit which performs mathematical or logic operations on the data stored in these storage registers.

The arithmetic unit is comprised of logic gates combined to form adders and other networks for performing logic operations.

There is also a program memory for storing a set of instructions to the microprocessor. These instructions, in their machine understandable form, are a series of logic 0's and 1's. The program memory is connected to a keyboard or other input means so that program instructions may be manually entered. A program counter serves to keep a record of which instruction in the stored program is to be executed next and provides the address for that instruction to a control means.

The control means is generally a decoder which serves the purpose of decoding a particular bit pattern representing an instruction into the proper control signals to be applied to the various devices enumerated above. The control means decodes, in order, each instruction in program memory designated by the program counter. A clock provides the pulse trains which initiate and synchronize all these operations. As each instruction is decoded, the proper control signals are sent to the various devices to cause them to perform the operations represented by that particular instruction.

A set of bus lines connect all these devices together, generally through control gates. Since no more than two devices should be connected to a particular bus line at any particular time, these control gates serve to disconnect all devices from a particular line not involved in the particular operation being performed.

Digital processor 5 contains a read only memory (ROM) to store data in which is stored forty-bit sequences of logic 0's and 1's as depicted in FIG. 3. The sequences are stored in the form of multi-bit words. Each sequence is assigned the "point value" shown at the extreme left of each horizontal row, and each point value represents one setting of dimmer control 1. Thus, there are forty possible power dissipation levels in the preferred embodiment each having its own sequence the first word of which starts at a different address in the ROM. The subsequent words of each sequence are stored in adjacent memory locations in the ROM.

The function of digital processor 5 is to perform logic operations on data arriving from zero voltage switch 10 and dimmer data circuit 4 to derive criteria for assessing whether and when to apply a complete half cycle to the load. In the preferred embodiment utilizing stored sequences of logic 0's and 1's, the criteria is derived by examining the individual bits of the sequence with the point value assigned to the particular setting of the dimmer control. If the bit examined is a logic 1, the criteria will be met and a half cycle will be sent through the load commencing at the next zero crossing. Alternatively, the criteria could be derived by the logic operations of establishing a figure N based upon the setting of dimmer control 1 and counting the number of zero crossing pulses 13A which occur and sending every $N^{th}$ pulse to gate 16 of Triac 18.

Referring again to FIG. 1, digital processor 5 sends trigger pulses 6 to trigger input 8 of dimmer data circuit 4 at the rate of one per every half cycle of the power supply voltage waveform. A half cycle of the power supply waveform includes the waveform between adjacent zero crossings. So, in FIG. 4, a half cycle would be between points 25 and 26, referring to FIGS. 1 and 4, the time at which zero crossing points such as 25 and 26 are reached are indicated to digital processor 5 at terminal 14 thereof by a series of zero crossing pulses 11 from zero voltage switch 10.

Returning to FIG. 1, when trigger pulse 6 is sent, dimmer data circuit 4 responds at terminal 9 with a dimmer data signal 27 which has a pulse width indicative of the setting of dimmer control 1. This dimmer data signal 27 enters digital processor 5 at terminal 28. Digital processor 5 then converts the width of pulse 27 into one of the forty possible point values. This can be done by using the dimmer data pulse 27 as a gating signal and counting the number of clock pulses of the internal clock of the digital processor which occur while pulse 27 is "high". The result of the count is stored in internal temporary storage.

Once a point value has been assigned to a particular dimmer data pulse 27, this point value must be either used as the address in the ROM for the first word in the sequence of 0's and 1's having that point value, or be converted to such an address. Once the starting address is available, digital processor 5 moves the word in that ROM location to a storage register. The processor then reads each bit in each word of the sequence in order of first bit to last bit and back to the first bit, at the rate of one bit per half cycle until the setting of the dimmer control is changed. Meanwhile, the processor continues to check for the arrival of the next zero crossing pulse from zero voltage switch 10. When it arrives, and if the bit read during the previous half cycle was a logic 1, an output trigger pulse 15 is sent to Triac 18. This is done by a suitable instruction or subroutine in the program memory associated with digital processor 5.

This can also be accomplished in discrete versions by using zero crossing pulse 11 as a trigger pulse to a "one shot" multi-vibrator with an AND gate whose inputs are the output of the "one shot" and the resultant logical 1 or 0 representing the bit just examined. When output trigger pulse 15 arrives at gate 16 of Triac 18, Triac 18 begins to conduct and continues to conduct till the next zero crossing of the power supply voltage waveform whereupon it shuts itself off when current through the load drops to zero. Triac 18 could be replaced by a pair of silicone controlled rectifiers connected with the anode of one tied to the cathode of the other and vice versa with the gates of both tied together. In this manner, the output trigger pulse 15 could cause the silicon controlled rectifiers to conduct regardless of whether the power supply voltage waveform was at that moment positive going or negative going.

During each half cycle, the status of dimmer control 1 is checked by digital processor 5. If the position of the dimmer control has not changed, the width of pulse 27 will not have changed and the resultant point value derived during the dimmer data pulse 27 will not have changed.

There are actually two storage registers involved in deriving the point value. The first register holds the point value during the most recent half cycle. The second register holds the point value obtained during the previous half cycle.

The program memory associated with digital processor 5 contains instructions which cause the point values derived during the most recent half cycle and the previous half cycle to be compared. If they are the same, the next bit of the sequence having the common point value will be examined. An output trigger pulse 15 will be sent to Triac 18 at the next zero crossing if the bit just examined is a logic 1.

However, if the point value has changed, the new point value in the first storage register will be moved to the second storage register. It will then be converted to the address of the first word in the bit sequence assigned to that point value. Each bit of that word and successive words in the sequence will be examined in first bit to last bit and back to first order, at the rate of one bit per half cycle, until the point value again changes.

The above described process continues till a halt instruction is given or the power is shut off.

Alternatively, digital processor 5 could decode said dimmer data signal 27 and derive therefrom a number N where N depends upon the desired level of power dissipation. Then digital processor 5 could count the number of half cycles of said power supply voltage waveform that occur as indicated by the number of zero crossing pulses 13A received at terminal 14 and send every Nth one to gate 16 of Triac 18.

FIG. 4 shows typical voltage waveforms that pass through the load for given point values. Each half cycle represents a particular bit in the sequence of 0's and 1's stored in the ROM for that particular point value. The solid half cycles indicates a 1 was found in the ROM location checked during the previous half cycle, and the dotted half cycles indicate a 0 was found.

FIG. 2 shows another embodiment wherein zero voltage switch 10 in FIG. 1, is incorporated within digital processor 29. Operation of this embodiment is in all aspects identical to the preferred embodiment shown in FIG. 1. Future embodiments may incorporate the dimmer data circuit into the digital processor.

Other embodiments may be devised using discrete components in either a digital or analog configuration.

In FIG. 5, an analog configuration is shown. An integrator 30 is connected to the gate 16 of the Triac 18 and is used to integrate the trigger pulses 15 that have been applied to the gate over the past few half cycles. The output signal 34 of the integrator 30 would be compared by a comparator circuit 31 to a reference signal 32 supplied by a dimmer data circuit 33 representing the desired level of power dissipation in the load. This reference signal can be a steady D.C. voltage. When the output signal 34 of the integrator 30 dips below the reference signal 32, the comparator 31 would generate a low voltage signal 35.

This low voltage signal 35 would, upon receipt of the next zero crossing pulse 11, cause a trigger pulse 15 to be sent to the gate of the Triac from a logic circuit 36 which can consist of an AND gate and a "one shot" multi-vibrator. This process is repeated until the output signal 34 of the integrator 30 rises to the level of the reference signal 32.

Other embodiments may employ analog to digital converters as the dimmer data circuit to convert a signal derived from an analog source into a digital dimmer data signal.

All discrete and integrated embodiments either digital or analog employing the principles disclosed herein are intended to be included.

What is claimed is:

1. A method for varying the average power dissipated in a load comprising:
   (a) storing at different addresses in a memory device pre-determined bit sequences of logic 0's and 1's, each sequence representing a different desired level of power dissipation;
   (b) generating data indicating the desired level of power dissipation;
   (c) generating data indicating the times of zero crossings of the voltage waveform of said power supply;
   (d) converting said data representing the desired level of power dissipation during the most recent half cycle of the voltage waveform of said power supply to the starting address in memory of the sequence of logic 0's and 1's representing the desired power dissipation;
   (e) reading the data stored at the address derived in step (d);
   (f) sending a complete half cycle of said voltage waveform of said power supply through said load if the bit read during the previous half cycle was a 1 at the next zero crossing;
   (g) repeating steps (b) through (g) until a halt command occurs or the power is shut off.

2. A method for varying the average power dissipated in a load comprising:

(a) storing a pre-determined sequence of logic 0's and 1's in a memory in the form of one or more multi-bit words, each sequence representing a different discrete level of desired power dissipation and having assigned to it a point value and a different memory address for the first word in each bit sequence;

(b) generating a dimmer data signal for every half cycle of a power supply voltage waveform said dimmer data signal representing the desired level of power dissipation in said load;

(c) generating data indicating the times of zero crossings of the voltage waveform of said power supply;

(d) converting said dimmer data signal for a first half cycle to the point value assigned to that particular level of desired power dissipation;

(e) converting the point value derived in step (d) above to an address for a word in the bit sequence of 0's and 1's assigned that point value starting with the first word;

(f) reading a bit in the word stored at the address derived in step (e) above starting with the first bit;

(g) sending a complete half cycle of said power supply voltage waveform through said load if the bit read in step (f) is a logic 1 commencing at the time of the next zero crossing of said power supply voltage waveform as indicated by the data generated in step (c) above;

(h) converting said dimmer data signal for the next half cycle to its particular point value;

(i) comparing the point value derived in step (h) with that of step (d);

(j) reading the next bit in the bit sequence having the point value derived in step (d) above if the comparison of step (i) above indicates the point values are the same;

(k) if the comparison of step (i) indicates the point values are not the same, converting the point value derived in step (h) above to an address of a word in the bit sequence assigned that point value starting with the first word;

(l) reading a bit in the word stored at the address derived in step (k) above starting with the first bit;

(m) sending a complete half cycle of said power supply voltage waveform through said load if the bit read in step (l) is a logic 1 commencing at the time of the next zero crossing of said power supply voltage waveform;

(n) repeating steps (b) through (n) reading each bit in each word of a sequence in first bit to last bit and back to first order until the point value derived in step (h) changes from that derived in step (d), then reading each bit in each word of the sequence assigned to the new point value in first to last and back to first order until the point value derived in step (h) again changes and repeating until power to the load is shut off or a halt command is given.

3. A method for varying the average power dissipation in a load comprising:

(a) generating a dimmer data signal for every half cycle of power supply voltage waveform representing the desired level of power dissipation in said load;

(b) generating data indicating the times of zero crossings of said voltage waveform of said power supply;

(c) integrating a series of signals where each signal represents one complete half cycle of said voltage waveform of said power supply that has been sent through said load and generating an output signal indicating the resulting integral;

(d) comparing the integral derived in step (c) above to said dimmer data signal generated in step (a) above;

(e) sending a complete half cycle to said load if the output signal of said integrator is lower than said dimmer data signal;

(f) repeating step (e) above till the comparison derived in step (d) above indicates said output signal derived in step (c) above equals said dimmer data signal derived in step (a) above.

4. A dimmer apparatus for varying the average power dissipation in a load comprising:

(a) a dimmer control;

(b) a dimmer data means connected to said dimmer control for generating a dimmer data signal representing the desired level of power dissipation in said load;

(c) zero crossing means connected to a power supply for determining the times of zero crossings of the power supply voltage waveform and for generating data indicating the times of said zero crossings;

(d) an output means connected to a load and to said power supply for switching complete half cycles of said power supply voltage waveform through said load when triggered by an output trigger pulse; and (e) a digital processor means connected to said dimmer data means and to said zero crossing means and to said output means for sampling the data generated by said dimmer data means and for performing logic operations on data arriving from said dimmer data means and from said zero crossing means, said logic operations for deriving criteria based on data from said dimmer data means and for sending a complete half cycle from zero crossing to zero crossing of said power supply voltage waveform through said load when the derived criteria for sending such a half cycle is met.

5. A dimmer apparatus as defined in claim 4 wherein said dimmer data means is an analog to digital converter for converting an analog signal derived from a dimmer control to a digital signal representing the desired level of power dissipation in said load.

6. A dimmer apparatus as defined in claim 4 wherein said dimmer data means comprises a device such as an integrated circuit timer with a data input for a variable resistance, and a trigger input said input being connected to said digital processor trigger for receiving a trigger pulse indicating that a sampling of the desired level of power dissipation is to be sent to said digital processor, and said dimmer data means having output terminals connected to said digital processor means for sending a dimmer data signal to said digital processor upon receipt of said trigger pulse, said dimmer data signal consisting of a pulse the width of which varies with the setting of said dimmer control.

7. A dimmer apparatus as defined in claim 5 or 6 wherein said dimmer data means and said digital processor means are combined into one integrated circuit.

8. A dimmer apparatus as defined in claim 4 wherein said dimmer data means is a self-contained variable setting device which converts its own setting within a range of possible settings to a digital signal at its output terminals.

9. A dimmer apparatus as defined in claim 4 wherein said zero crossing means is a zero voltage switch comprised of means for detecting zero crossings of a cyclical power supply voltage waveform and means for generating zero crossing pulses indicating the times of said zero crossings.

10. A dimmer apparatus as defined in claim 4 wherein said zero crossing means and said digital processor means are combined in a single integrated circuit.

11. A dimmer apparatus as defined in claim 4 wherein said digital processor means is comprised of:
 (a) data memory means within said digital processor for storing predetermined bit sequences of logic 0's and 1's each sequence representing a different discrete power dissipation setting of said dimmer control;
 (b) a program memory means for storing a set of instructions;
 (c) a storage register means for temporary storage of data transferred from other devices within and without said digital processor means;
 (d) an arithmetic means for performing mathematical and logical operations upon data in said storage register;
 (e) a clock means for supplying periodic waveforms used to initiate and synchronize various operations in said digital processor means;
 (f) a program counter means for indicating which of said instructions is to be executed next;
 (g) a control means for executing each instruction designated by said program counter means by sending control signals to the device defined in subparagraphs (a) thru (d) and (f) needed to perform a particular operation;
 (h) bus means connecting all the devices in subparagraphs (a) through (h) above to each other for carrying said data and control signals between the devices defined in subparagraph (a) through (h).

12. A dimmer apparatus as defined in claim 4 wherein said output means is a Triac connected to said load with the gate of said Triac connected to an output terminal of said digital processor means through which output terminal said digital processor dispenses a trigger pulse when said derived criteria are met.

13. A dimmer apparatus as defined in claim 4 wherein said output means is a pair of silicon controlled rectifiers connected with the trigger inputs tied together and the anode of the first connected to the cathode of the second and the cathode of the first connected to the anode of the second, so that a single trigger pulse will allow a complete half cycle through to the load regardless of whether the power supply voltage waveform is at the moment of said trigger pulse, positive going or negative going.

14. A dimmer apparatus as defined in claim 4 wherein said logic operations performed by said digital processor means comprises decoding said dimmer data signal and arriving at a number N where N depends upon the desired level of power dissipation and then counting the number of half cycles of said power supply voltage waveform that occur and sending every Nth one to the load.

15. A dimmer apparatus for varying the average power dissipation in a load comprising:
 (a) a dimmer data means connected to a dimmer control for generating a reference signal representing the desired level of power dissipation in said load;
 (b) a zero crossing means connected to a power supply for determining the times of zero crossings of the power supply voltage waveform of said load and for generating data indicating the times of said zero crossings;
 (b) an output means with a trigger input connected said load and said power supply for gating complete half cycles of said power supply waveform to said load when triggered by a pulse applied to said trigger input;
 (d) an analog logic means comprised of:
  (i) an integrating means connected to said load for integrating the power dissipation in the load over a period and for generating an output indicative of this integral;
  (ii) a comparator means connected to said integrating means and to said dimmer data means to pulse for application to trigger input of said output means when said output of said averaging means indicates power dissipation in the load is falling below the desired level as indicated by said reference signal.

16. A dimmer apparatus for varying the average power dissipation in a load comprising:
 (a) a dimmer control comprising a variable resistance;
 (b) a dimmer data means comprising a timer device with input terminals connected to said dimmer control and having a status terminal and a trigger input, said dimmer data means for sending a dimmer data signal the characteristics of which vary with the setting of said dimmer control from said status terminal when a pulse is applied to said trigger input on said dimmer data means;
 (c) a zero crossing means with input terminals connected to a power supply comprising a zero voltage switch for determining the times of zero crossings of the voltage waveform of said power supply and for sending zero crossing pulses indicating the times of said zero crossings from an output terminal;
 (d) a Triac connected to said load and to said power supply and having a Triac trigger input said Triac for gating complete half cycles of said power supply voltage waveform through said load when an output trigger pulse is applied to said Triac trigger input;
 (e) a digital processor means connected to said status terminal and said trigger input of said dimmer data means and to said output terminal of said zero crossing means, and to said Triac trigger input for applying a trigger pulse to said trigger input every half cycle of said power supply voltage waveform and to convert said dimmer data signal received every half cycle from said status terminal and to compare this digital data with said digital data derived during the previous half cycle to see if this position of said dimmer control has changed and to read from an address in memory holding pre-programmed data corresponding to a particular setting of said dimmer control, and to send and output trigger pulse to said Triac trigger input upon receipt of said next zero crossing pulse when said data read from said address in memory is logic 1 but not if it is a logic 0.

17. A method for varying the average power dissipated in a load comprising
 generating a signal indicating the desired level of power dissipation,
 determining the number of half-cycle waveforms needed to supply the desired level of power dissipation in response to the generated signal, and providing to the load the appropriate number of half-cycle waveforms needed to supply the desired level of power dissipation.

18. Apparatus for varying the average power dissipation in a load comprising control means for selecting a desired level of power dissipation, zero-crossing switch means responsive to zero-crossings of an AC waveform, and processing means for determining from the control means the number of half-wave cycles of an AC waveform needed to provide the desired level of power dissipation, and responsive to the control zero-crossing switch means for applying the selected number of half-wave cycles to a load.

19. The apparatus of claim 18 wherein said processing means includes a logic sequence for determining the number of half-wave cycles needed to provide the desired level of power dissipation.

20. The apparatus of claim 19 wherein said processing means is a microprocessor.

* * * * *